(12) United States Patent
Kim et al.

(10) Patent No.: US 11,226,030 B2
(45) Date of Patent: Jan. 18, 2022

(54) MOTOR APPARATUS HAVING OIL CIRCULATION STRUCTURE

(71) Applicants: Hyundai Motor Company, Seoul (KR); Kia Motors Corporation, Seoul (KR)

(72) Inventors: Shin Jong Kim, Hwaseong-si (KR); Sang Jin Park, Hwaseong-si (KR); Seung Jae Kang, Seoul (KR); Jong Hyun Kim, Yongin-si (KR); Byoung Hoon Choi, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/031,419

(22) Filed: Sep. 24, 2020

(65) Prior Publication Data

US 2021/0388895 A1   Dec. 16, 2021

(30) Foreign Application Priority Data

Jun. 16, 2020   (KR) ........................ 10-2020-0073114

(51) Int. Cl.

| | |
|---|---|
| *F16H 57/037* | (2012.01) |
| *B60K 1/00* | (2006.01) |
| *B60K 17/16* | (2006.01) |
| *B60K 17/22* | (2006.01) |
| *F16H 57/04* | (2010.01) |
| *H02K 5/20* | (2006.01) |
| *H02K 7/116* | (2006.01) |
| *H02K 9/19* | (2006.01) |
| *F16H 57/02* | (2012.01) |

(52) U.S. Cl.
CPC ............. *F16H 57/037* (2013.01); *B60K 1/00* (2013.01); *B60K 17/16* (2013.01); *B60K 17/22* (2013.01); *F16H 57/045* (2013.01); *F16H 57/0424* (2013.01); *H02K 5/20* (2013.01); *H02K 7/116* (2013.01); *H02K 9/19* (2013.01); *F16H 2057/02034* (2013.01); *F16H 2057/02043* (2013.01)

(58) Field of Classification Search
None
See application file for complete search history.

(56) References Cited

U.S. PATENT DOCUMENTS

| | | | | |
|---|---|---|---|---|
| 1,978,835 | A * | 10/1934 | Cotterman | .......... F16H 57/0447 384/398 |
| 8,267,223 | B2 * | 9/2012 | Ideshio | ............... F16H 57/0447 184/6 |

(Continued)

FOREIGN PATENT DOCUMENTS

| | | | |
|---|---|---|---|
| DE | 4132780 A1 * | 4/1992 | ......... F16H 57/0494 |
| KR | 10-1509928 B1 | 4/2015 | |

*Primary Examiner* — Dirk Wright
(74) *Attorney, Agent, or Firm* — Morgan, Lewis & Bockius LLP

(57) ABSTRACT

A motor apparatus having an oil circulation structure may collect churning oil inside a housing and efficiently disperses the collected oil in each drive system, smoothly performing cooling and lubrication of the drive system including a motor and a reduction gear. Furthermore, even under low or high load conditions of the drive system, the oil level inside the housing is maintained at a constant level to maintain desired lubrication and cooling performance.

10 Claims, 9 Drawing Sheets

(56) References Cited

U.S. PATENT DOCUMENTS

| | | | |
|---|---|---|---|
| 9,856,971 B2* | 1/2018 | Mikami | F16H 57/0471 |
| 11,054,019 B2* | 7/2021 | Lamm | F16H 57/0457 |
| 2019/0170243 A1* | 6/2019 | Brizendine | F16H 57/0434 |

* cited by examiner

MOTOR APPARATUS HAVING OIL CIRCULATION STRUCTURE

CROSS REFERENCE TO RELATED APPLICATION

The present application claims priority to Korean Patent Application No. 10-2020-0073114, filed Jun. 16, 2020, the entire contents of which is incorporated herein for all purposes by this reference.

BACKGROUND OF THE INVENTION

Field of the Invention

The present invention relates to a motor apparatus having an oil circulation structure in which oil for cooling and lubrication in the motor apparatus is automatically circulated when a drive system is operated, and which allows the oil level therein to be maintained at a constant level.

Description of Related Art

In recent years, as environmental issues have become a global concern, research on vehicle technologies that consider an environment, such as reduction in the amount of exhaust gas, improvement in fuel efficiency, and the like, related to vehicles is being actively conducted. Representative examples of the vehicles are hybrid vehicles, electric vehicles, and the like as eco-friendly vehicles.

Such an eco-friendly vehicle is provided with a motor as a power source, and the motor includes a shaft mounted in a center portion of a motor housing, a rotor core having a permanent magnet, a spider integrally connecting the shaft and the rotor core, a stator core disposed on an external diameter side of the rotor core, and a coil surrounding opposite sides of the stator core. Here, an oil pump mounted, on the external surface of the motor housing, coaxially with the shaft; a cooling oil supply line extending from an outlet side of the oil pump toward an inside surface of the spider; and a cooling oil return line connecting a bottom surface of the motor housing filled with cooling oil and an inlet side of the oil pump are configured so that cooling of the motor is be performed.

Along with this, when a reduction gear is further configured in the motor, a structure for cooling the reduction gear is further added. Accordingly, the cooling structure of the motor and the reduction gear becomes complicated, and as an overall size increases, it is disadvantageous in terms of packaging.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a motor apparatus having an oil circulation structure in which oil for cooling and lubrication in the motor apparatus is automatically circulated when a drive system is operated, allowing desired lubrication and cooling to be performed and an oil level therein to be maintained at a constant level.

In various aspects of the present invention, there may be provided the motor apparatus having the oil circulation structure, the motor apparatus including: a motor housing through which a driveshaft is provided to pass and provided with a driving motor configured as a power source for driving the driveshaft; and a gear housing coupled to a side of the motor housing and provided with a reduction gear set disposed on a line of the driveshaft, configured to reduce rotational speed of the driveshaft, wherein the gear housing may be provided with a first reservoir unit collecting churning oil caused by the reduction gear set and with a connection flow channel guiding the oil to move to a side of the motor housing when at least a predetermined amount of the oil is stored in the first reservoir unit, and the motor housing may be provided with a second reservoir unit fluidically connected to the connection flow channel and storing the oil introduced into the second reservoir unit through the connection flow channel.

The reduction gear set may include: a differential gear unit coupled to the driveshaft; and a reduction gear unit disposed on a top side of the differential gear unit and connected to the differential gear unit.

The gear housing may be provided with a differential cover supporting the differential gear unit, and the first reservoir unit collecting the churning oil may be provided on the differential cover.

The differential cover may include: a body unit through which the driveshaft passes, and which supports the differential gear unit; and a first reservoir unit formed on a top side of the body unit and configured to be open upwards, allowing the churning oil to be collected therein.

The first reservoir unit may be provided with a first drain hole formed to penetrate through downward toward the driveshaft and with the connection flow channel connected thereto to be open to a side thereof.

The motor housing may be provided with an installation space in which a driving motor may be provided and with the second reservoir unit at an upper side of the installation space to be open to the connection flow channel.

The second reservoir unit may be provided with a second drain hole penetrating through the second reservoir unit downward toward the installation space, and a connection hole penetrating through the second reservoir unit to allow the connection flow channel to be fluidically connected to the second reservoir unit.

The motor housing and the gear housing may be provided with balance holes open to communicate with each other when being coupled to each other, whereby the oil in the motor housing and gear housing may move through the balance holes.

The gear housing may be provided with a guide unit located at a side of the gear housing above the differential gear unit, the guide unit thus being in contact with the churning oil caused by the differential gear unit and allowing the contacted oil to be moved toward the first reservoir unit.

The guide unit may be configured to have a predetermined area, with opposite end portions thereof being bent downward.

The gear housing may be provided with a third reservoir unit disposed away from the first reservoir unit and configured to collect the oil being moved by the guide unit.

The third reservoir unit may be configured to be open upward toward the guide unit and be provided with a third drain hole penetrating through downward.

The motor apparatus having the above-described oil circulation structure collects churning oil inside a housing and efficiently disperses the collected oil in each drive system, allowing cooling and lubrication of the drive system including the motor and a reduction gear to be smoothly performed. Furthermore, even under low or high load conditions of the drive system, the oil level inside the housing is maintained at a constant level to maintain desired lubrication and cooling performance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
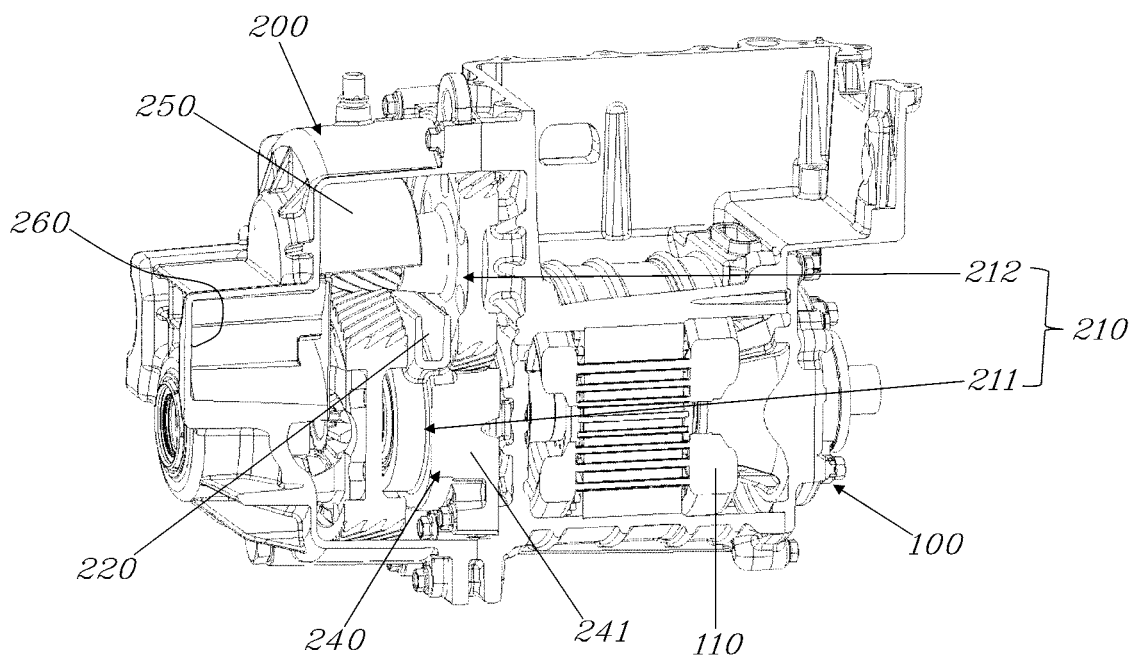
FIG. 1 is a view showing a motor apparatus having an oil circulation structure according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, a motor apparatus having an oil circulation structure according to exemplary embodiments of the present invention will be described in detail with reference to the accompanying drawings. Throughout the drawings, the same reference numerals will refer to the same or like parts.

FIG. 1 is a view showing a motor apparatus having an oil circulation structure according to various exemplary embodiments of the present invention, and FIG. 2, FIG. 3, FIG. 4, FIG. 5, FIG. 6, FIG. 7, FIG. 8, and FIG. 9 are views explaining the motor apparatus having the oil circulation structure shown in FIG. 1.

The motor apparatus having the oil circulation structure according to various exemplary embodiments of the present invention according to various exemplary embodiments of the present invention, as shown in FIG. 1, FIG. 2, FIG. 3, FIG. 4, FIG. 5, FIG. 6, FIG. 7, FIG. 8 and FIG. 9, includes: a motor housing through which a driveshaft 111 passes and provided with a driving motor 110 configured as a power source for the driveshaft 111; and a gear housing 200 coupled to a side of the motor housing 100 and provided with a reduction gear set 210 disposed on a line of the driveshaft 111, reducing rotational speed of the driveshaft 111.

That is, in various exemplary embodiments of the present invention, the driving motor 110 and the reduction gear set 210 are integrally configured, and the driveshaft 111 is configured to be connected to the driving motor 110 and the reduction gear set 210. Accordingly, the motor housing 100 provided with the driving motor 110 and the gear housing 200 provided with the reduction gear set 210 may be integrally configured and may be configured to be coupled to each other in a state of being separately configured.

Oil for lubrication and cooling is built in the motor housing 100 and the gear housing 200, and a portion of each of the driving motor 110 and the reduction gear set 210 is configured to be immersed in the oil. Accordingly, during the operation of the driving motor 110, oil churning is caused in the driving motor 110 and the reduction gear set 210 by rotational motion.

In various exemplary embodiments of the present invention, the gear housing 200 is provided with a first reservoir unit 220 collecting churning oil caused by the reduction gear set 210 and with a connection flow channel 230 guiding the oil to move to a side of the motor housing 100 when at least a predetermined amount of the oil is stored in the first reservoir unit 220.

Furthermore, the motor housing 100 is provided with a second reservoir unit 120 connected to the connection flow channel 230 and storing the oil introduced into the second reservoir unit 120 through the connection flow channel 230.

According to this, during the rotation of the reduction gear set 210 according to the operation of the driving motor 110, the churning oil caused by the reduction gear set 210 is collected in the first reservoir unit 220, and the oil collected in the first reservoir unit is transmitted to each drive system, whereby cooling and lubrication efficiency may be improved through efficient oil circulation. That is, the first reservoir unit 220 is provided with a first drain hole 221 penetrating through downward toward the driveshaft 111, allowing the oil collected in the first reservoir unit 220 to be circulated within the gear housing 200. Furthermore, the cooling and lubrication of the driveshaft 111 may also be made.

Figure 2:
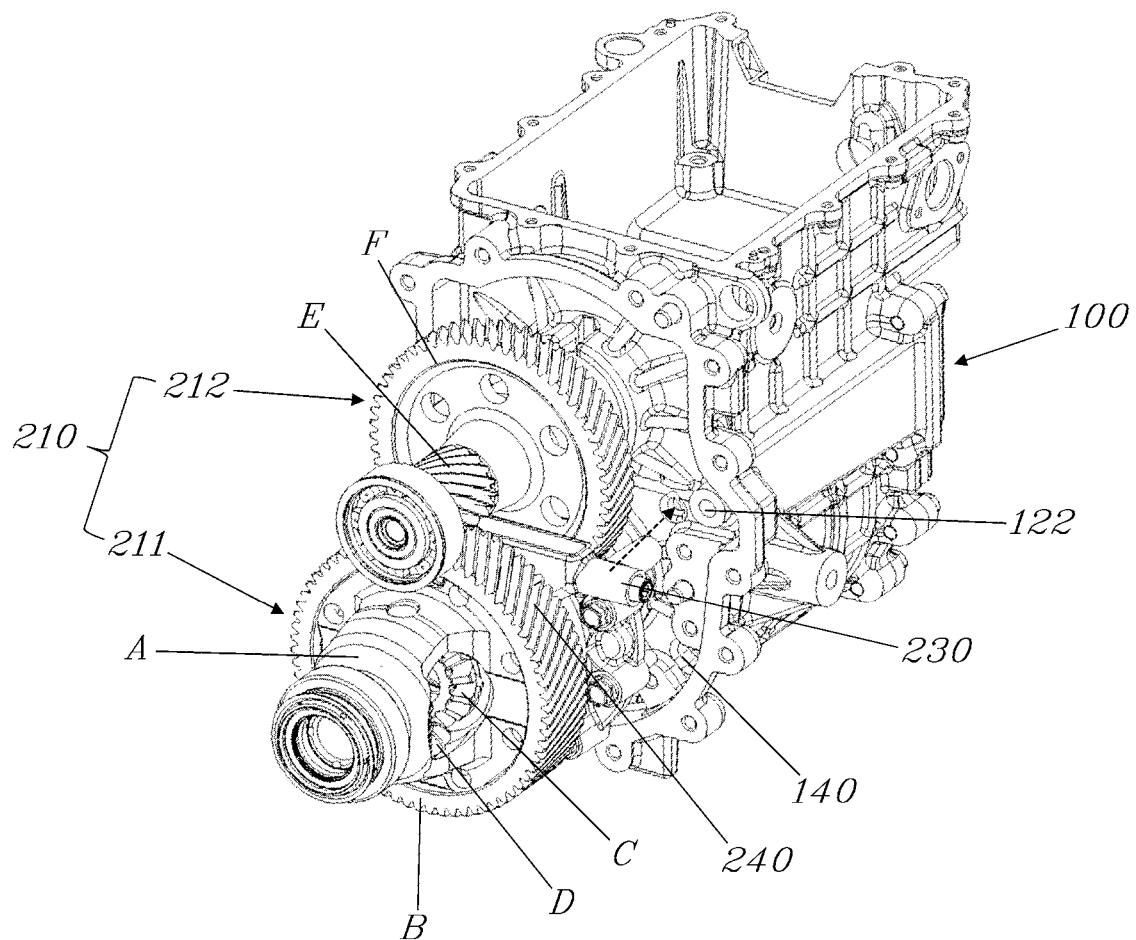
FIG. 2, FIG. 3, FIG. 4, FIG. 5, FIG. 6, FIG. 7, FIG. 8, and FIG. 9 are views explaining the motor apparatus having the oil circulation structure shown in FIG. 1.

Furthermore, the first reservoir unit 220 is connected to the connection flow channel 230 and the connection flow channel 230 is connected to be open to the second reservoir unit 120 provided in the motor housing 100. Accordingly, the oil collected in the first reservoir unit 220 is moved to the second reservoir unit 120 through the connection channel 230. Here, the connection flow channel 230 is connected to a side of the first reservoir unit 220 so that interference with other driving portions including the reduction gear set 210 may be avoided. Accordingly, as shown in FIG. 2, the connection flow channel 230 may extend to the side and then bend, providing a shape extending to the side of the motor housing 100.

Figure 4:
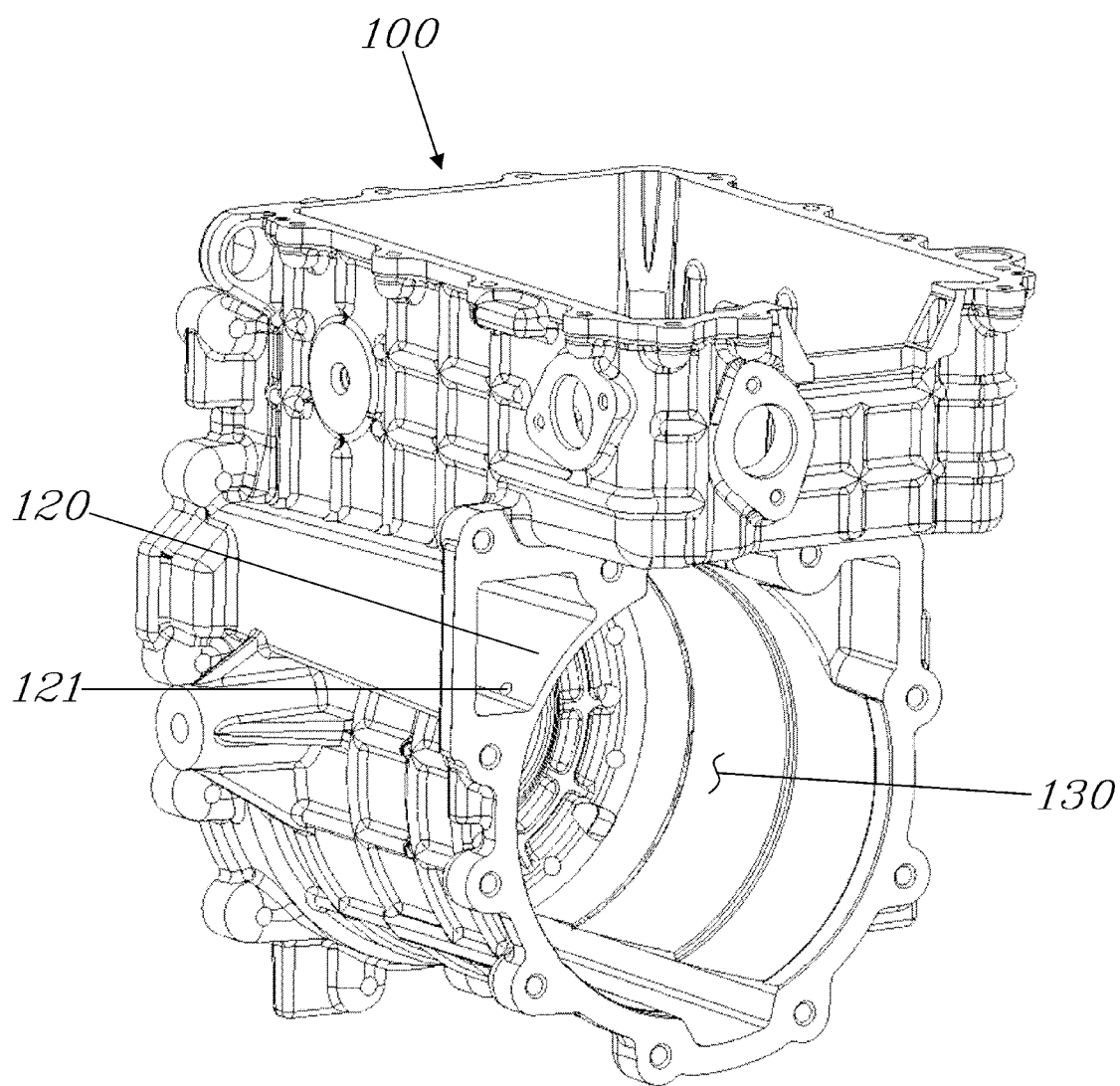
Figure 5:
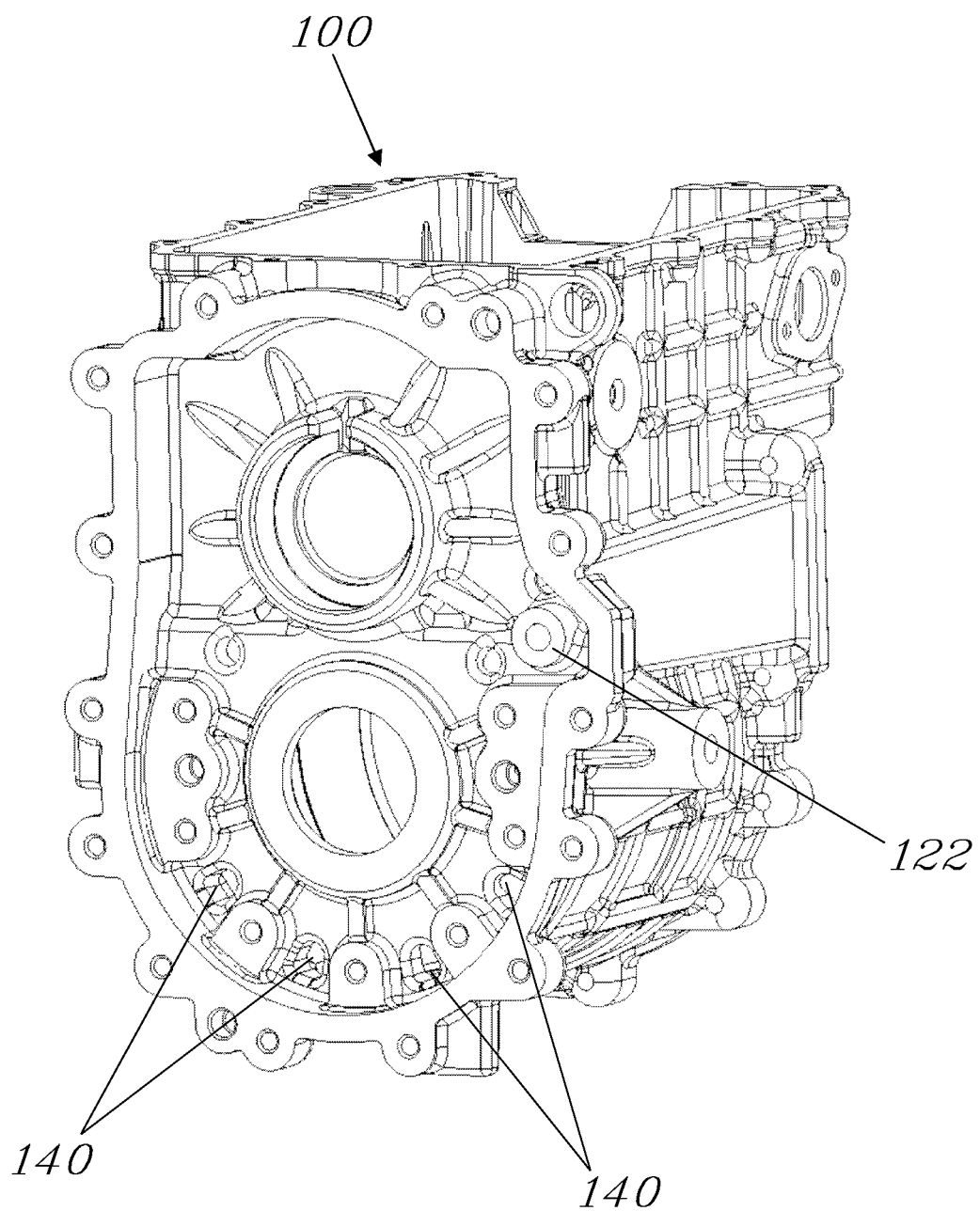

In the present way, as the oil moved from the first reservoir unit 220 is stored in the second reservoir unit 120, the oil stored in the second reservoir unit 120 may be transmitted to the drive system, being provided to a side of the drive motor 110. That is, as shown in FIGS. 4 to 5, the motor housing 100 is provided with an installation space 130 in which a driving motor 110 is provided, and with the second reservoir unit 120 at an upper side of the installation space to be open to the connection flow channel. Here, the installation space 130 may be sealed by a separate cover to provide the second reservoir unit 120. It may be seen that the cover is coupled to a rightmost side of the motor housing 100 in FIG. 1. Accordingly, the motor housing 100 is provided with the second reservoir unit 120 at an upper side of the installation space 130 in which the driving motor 110 is provided so that the second reservoir unit 120 may be easily connected to the connection flow channel 230 extending from the first reservoir unit 220, and the oil stored in the second reservoir unit 120 may be moved downward, being transmitted to the side of the driving motor 110. Accordingly, the second reservoir unit 120 may be provided with a second drain hole 121 penetrating through downward toward the installation space 130 and with a connection hole 122 penetrating through to allow the connection flow channel to be connected thereto. Due to the provided configuration, the oil collected in the second reservoir unit 120 may be circulated in the motor housing 100 through the second drain hole 121, and cooling and lubrication of the driving motor 110 may also be achieved. Furthermore, the connection hole 122 through which the connection flow channel 230 is provided to penetrate is provided in the second reservoir unit 120, and a sealing member for sealing the connection hole 122 may be provided. Accordingly, when the gear housing 200 and the motor housing 100 are coupled to each other, the connection flow channel 230 of the gear housing 200 matches and communicates with the connecting hole 122 of the motor housing 100, whereby the oil circulation structure may be accomplished.

Describing in detail with respect to the present invention described above, as shown in FIG. 1, FIG. 2, and FIG. 3, the reduction gear set 210 may include a differential gear unit 211 coupled to the driveshaft 111 and a reduction gear unit 212 disposed on a top side of the differential gear unit 211 and connected to the differential gear unit 211.

Figure 3:
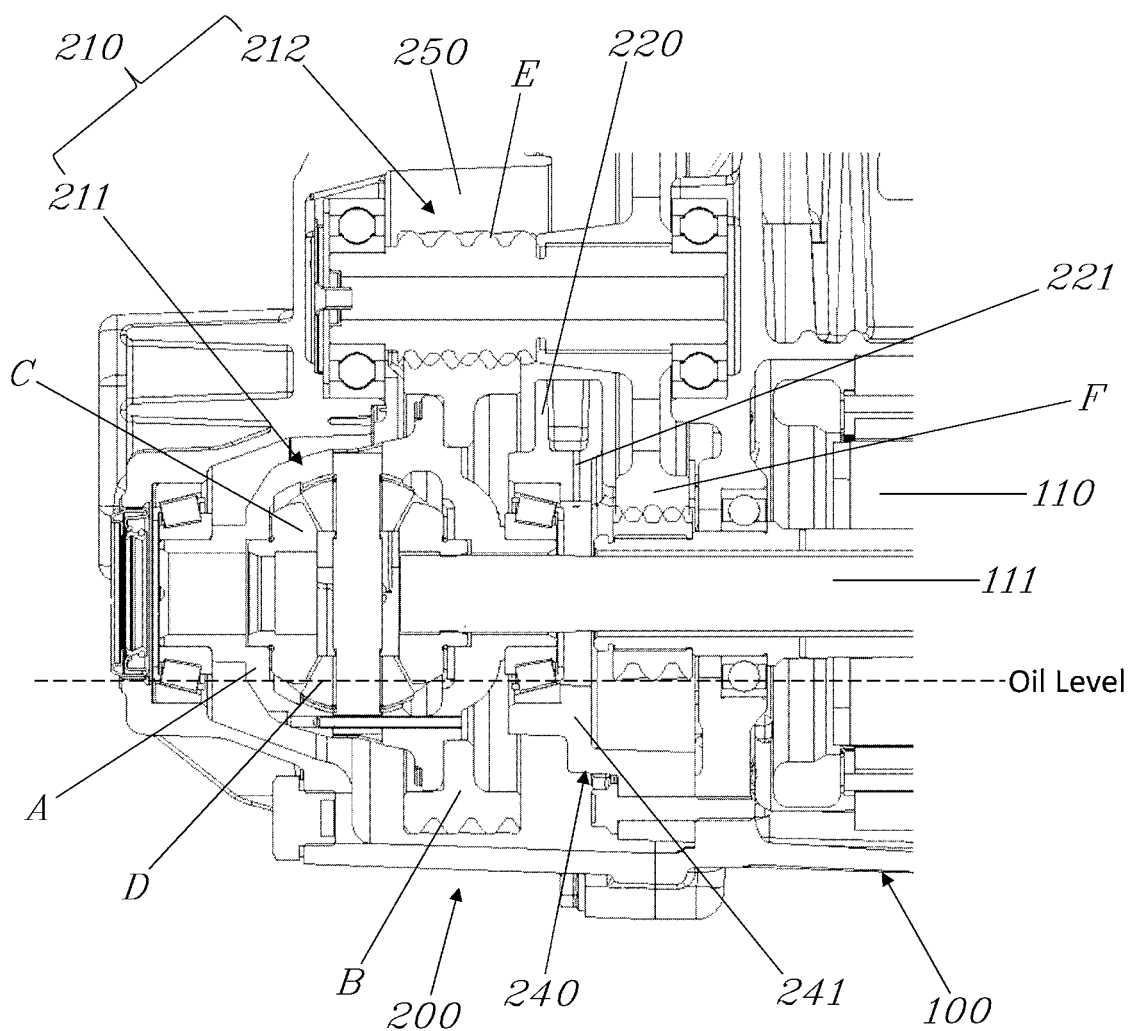

Here, a gear structure of the differential gear unit 211 and a gear structure of the reduction gear unit 212 are various known technologies, and various gear structures may be selectively applied. Briefly describing the differential gear unit 211 and the reduction gear unit 212, as shown in FIG. 3, in the case of the differential gear unit 211, it may include a case A, a ring gear B, a differential pinion gear C, and a differential side gear D, and in the case of the reduction gear unit 212, it may include a subordinate reduction gear E and the output gear F, being configured to reduce the rotational speed of the differential gear unit 211.

Here, the differential gear unit 211, which includes a relatively large gear, is disposed on the lower side of the reduction gear unit 212, whereby the churning of the oil in the gear housing 200 is largely generated. Accordingly, oil circulation through each reservoir unit may be efficiently realized.

Figure 6:
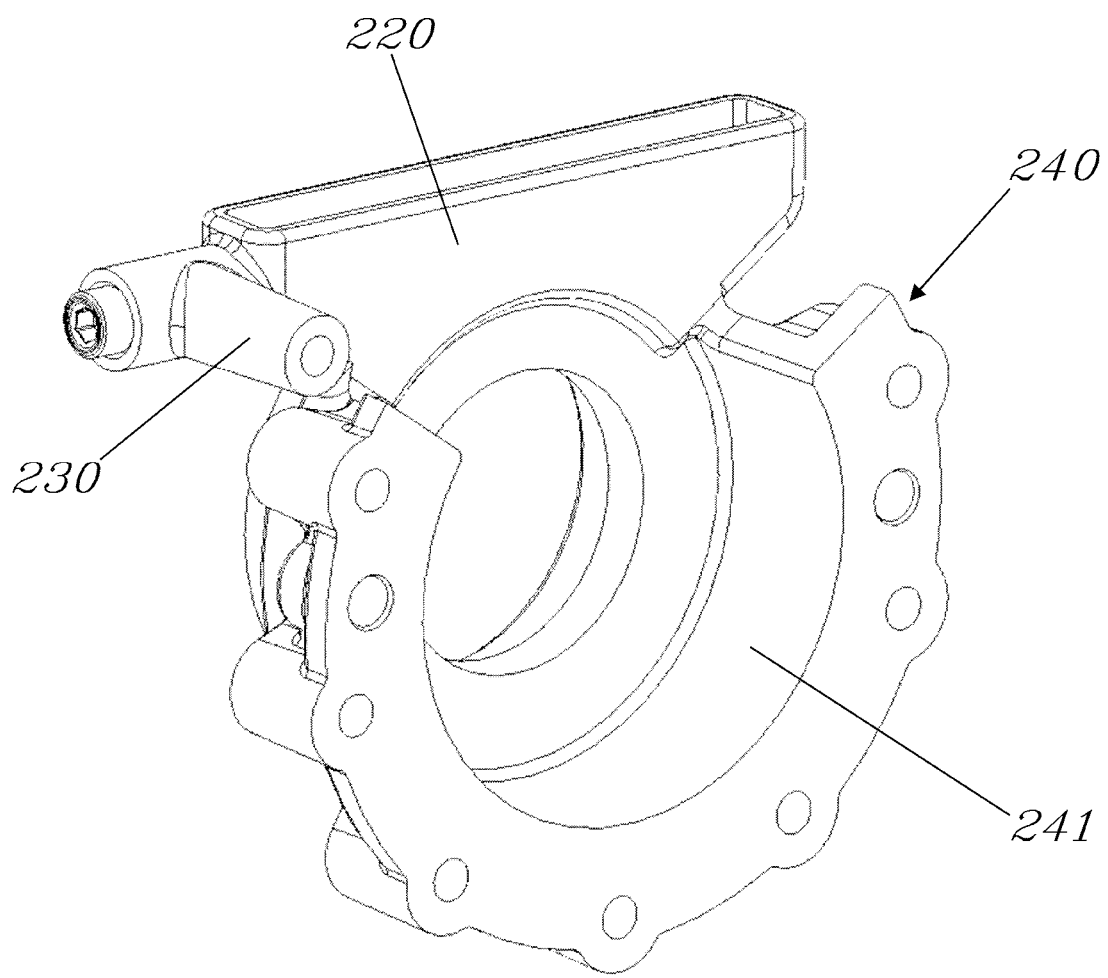
Figure 7:
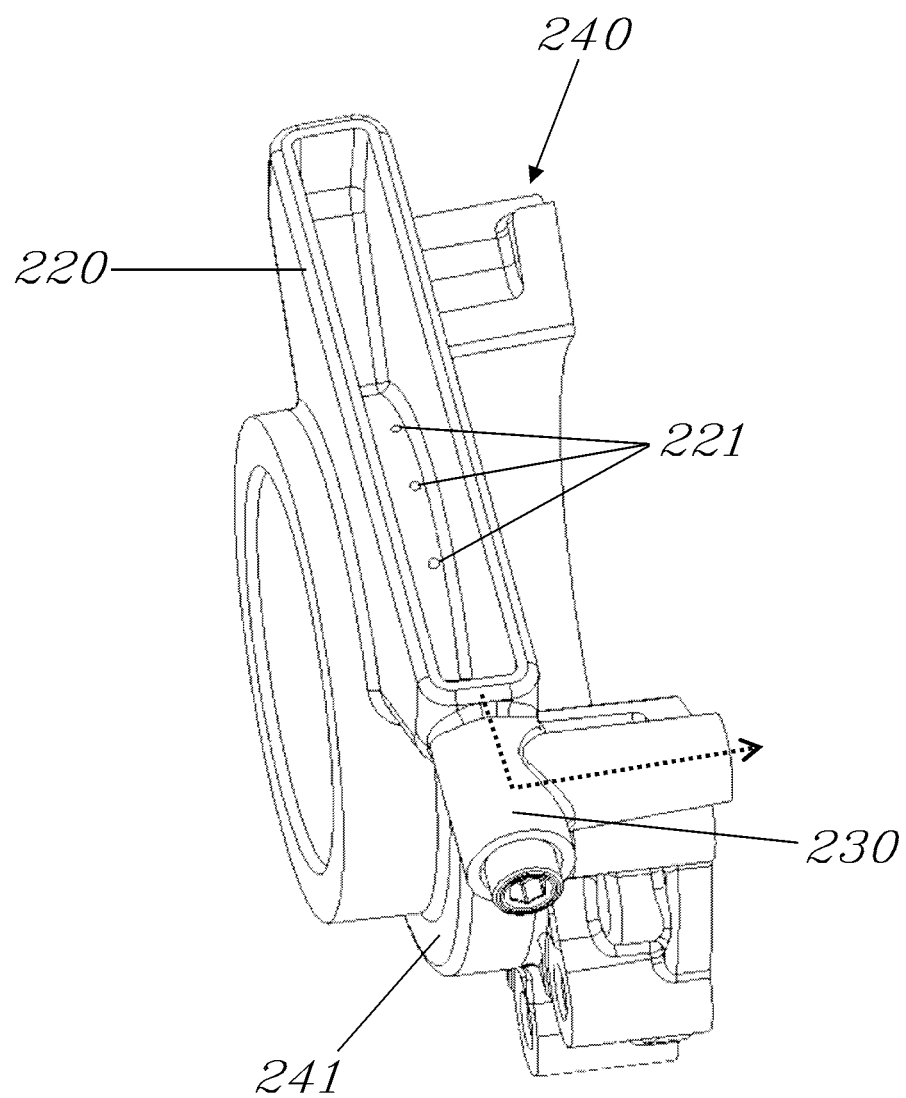

On the other hand, as shown in FIGS. 6 to 7, the gear housing 200 is provided with a differential cover 240 supporting the differential gear unit 211, and the first reservoir unit collecting the churning oil may be formed on the differential cover 240. The differential cover 240 may be integrally configured with the gear housing 200 or coupled to the gear housing 20 by being separately configured. Accordingly, the differential cover 240 may be configured to include: a body unit 241 through which the driveshaft 111 passes and which supports the differential gear unit 211; and a first reservoir unit 220 formed on a top side of the body unit 241 and configured to be open upwards, allowing the churning oil to be collected therein. That is, the differential cover 240 is coupled to the gear housing 200 in a state where the body unit 241 through which the driveshaft 111 passes supports the bearing provided in the differential gear unit 211. In the case of the body unit 241, when the gear housing 200 and the motor housing 100 are combined with each other, it may be coupled and fixed together to the motor housing 100. Due to the provided configuration, the differential gear unit 211 may be securely fixed at the inside through the gear housing 200 and the differential cover 240. As the first reservoir unit 220 is formed on the top side of the body unit 241, it is easy to collect the churning oil.

Accordingly, the differential gear unit 211 may be stably fixed as the gear housing 200 and the differential cover 240 surround and support the differential gear unit 211. Furthermore, as the first reservoir unit 220 is formed on the differential cover 240, the process for providing the first reservoir unit 220 in the gear housing 200 is obviated, and the first reservoir unit 220 may be disposed in the gear housing 200 by coupling the differential cover 240 to the gear housing 200.

On the other hand, as shown in FIGS. 2 and 5, the motor housing 100 and the gear housing 200 are provided with balance holes 140 open to communicate with each other when being coupled to each other, whereby the oil in the motor housing 100 and gear housing 200 may be moved through the balance holes 140. A plurality of such balance holes 140 may be provided in the lower portion of each of the motor housing 100 and the gear housing 200. Due to the provided configuration, the oil storage amount of the motor housing 100 and the gear housing 200 may not be biased to either side, maintaining a balance of the oil storage amount.

Figure 8:
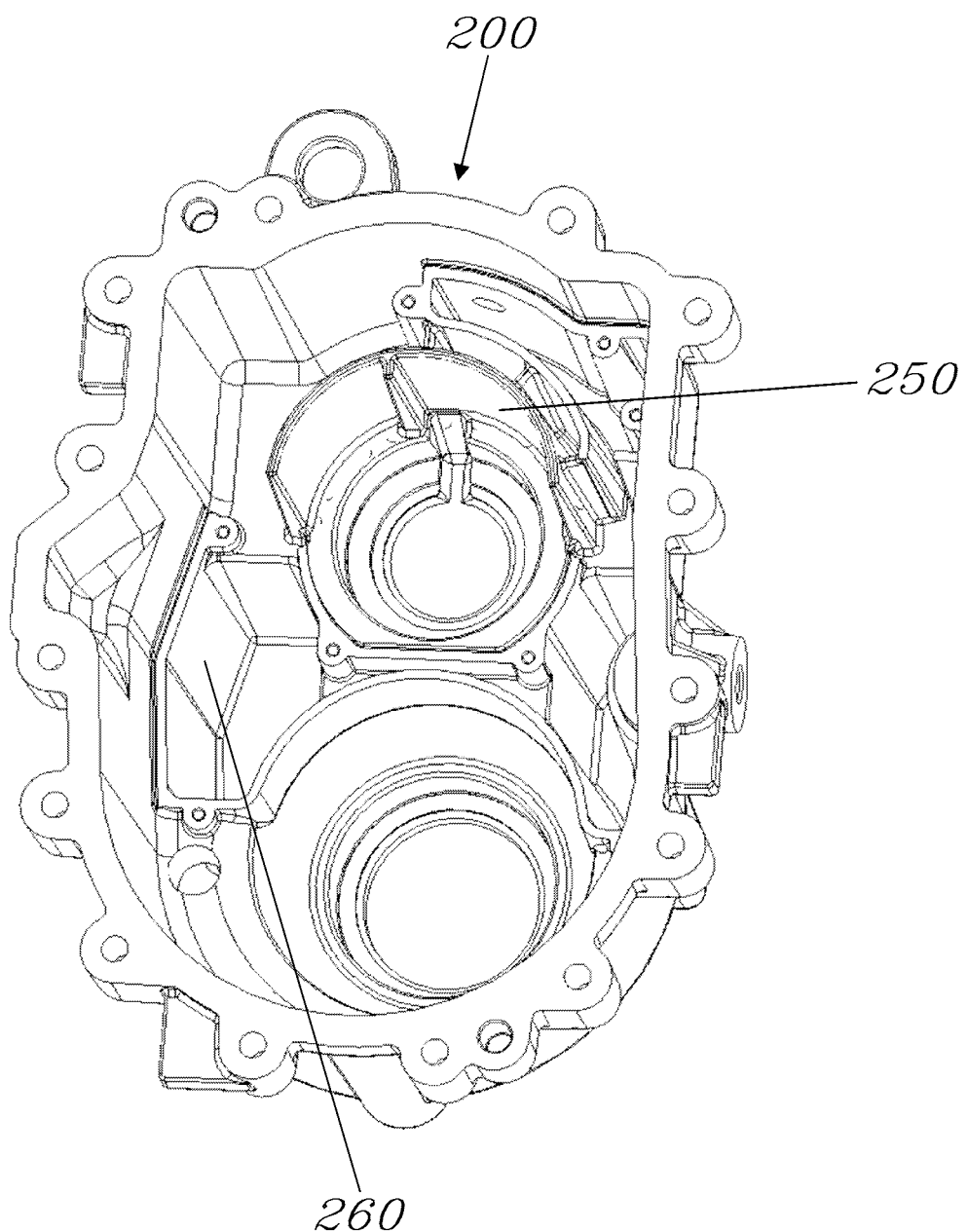

On the other hand, as shown in FIGS. 1 and 8, the gear housing 200 may be provided with a guide unit 250 located at a side above the differential gear unit 211, being in contact with the churning oil caused by the differential gear unit 211 and allowing the contacted oil to be moved toward the first reservoir unit 220.

That is, the oil moved upward by the differential gear unit 211 is formed into droplets in the guide unit 250 or becomes to hit the guide unit 250. The oil is moved toward the first reservoir unit 220 by being guided in a direction which is moved downwards by the guide unit 250. Accordingly, inside the gear housing 200, the guide unit 250 is formed on the side above the differential gear unit 211, whereby the churning oil caused by the differential gear unit 211 is guided by the guide unit 250, being moved to the first reservoir unit 220. Accordingly, the amount of oil collected in the first reservoir unit 220 may be secured.

As shown in FIG. 8, the guide unit 250 may be configured to have a predetermined area, with opposite end portions thereof being bent downward. That is, the guide unit 250 has the predetermined area, so a contact area of the churning oil is increased, and the opposite end portions of the guide unit 250 are bent downward toward the first reservoir unit 220, whereby the oil being brought into contact with the guide unit 250 is moved along the guide unit 250, being moved to the first reservoir unit 220.

Figure 9:
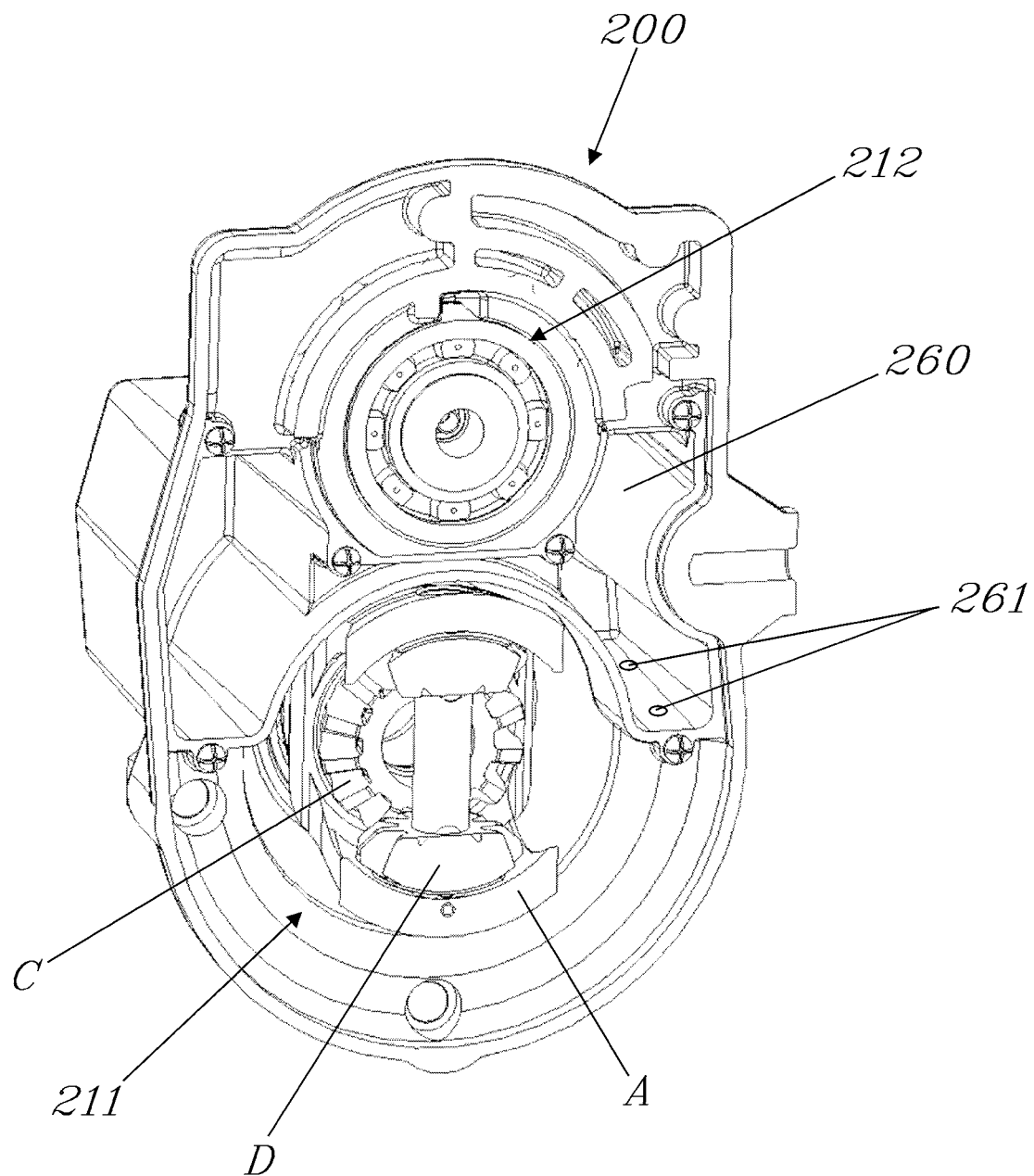

Furthermore, as shown in FIGS. 8 to 9, the gear housing 200 may be provided with a third reservoir unit 260 disposed away from the first reservoir unit 220 and collecting the oil being moved by the guide unit 250.

Due to the provided configuration, during the rotation of the reduction gear set 210 according to the operation of the driving motor 110, the churning oil caused by the reduction gear set 210 is collected into the first reservoir unit 220 and the third reservoir unit 260. Subsequently, the oil collected in the first reservoir unit 220 and the third reservoir unit 260 is transmitted to each drive system, improving cooling and lubrication efficiency through efficient oil circulation. Accordingly, as the first reservoir unit 220 and the third reservoir unit 260 collecting the churning oil are disposed away from each other inside the gear housing 200, the collection amount of the churning oil is secured, and efficient lubrication and cooling may be performed in areas where efficient lubrication and cooling are required in the portions disposed in the gear housing 200.

The third reservoir unit 260 may be configured to be open upward toward the guide unit 250 and with a third drain hole 261 penetrating through downward. Due to the provided configuration, the oil collected in the third reservoir unit 260 may be smoothly circulated through the third drain hole 261 inside the gear housing 200.

In the case of the second reservoir unit 120 and the third reservoir unit 260 described above, since the parts to be built in the motor housing 100 and the gear housing 200 are configured as a circular shape, the parts may include two spaces that are left and right spaces, and the separated left and right spaces may be connected to each other, providing each reservoir unit.

The motor apparatus having the above-described oil circulation structure collects the churning oil inside the housing and efficiently disperses the collected oil in each drive system, smoothly cooling and lubricating the drive system including the motor and the reducer gear. Furthermore, even under low or high load conditions of the drive system, the oil level inside the housing is maintained at the constant level, whereby the desired lubrication and cooling performance is maintained.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A motor apparatus having an oil circulation structure, the motor apparatus comprising:
   a motor housing through which a driveshaft is provided to pass and provided with a driving motor configured as a power source for driving the driveshaft; and
   a gear housing coupled to a side of the motor housing and provided with a reduction gear set disposed on a line of the driveshaft and configured to reduce rotational speed of the driveshaft,
   wherein the gear housing is provided with a first reservoir unit collecting churning oil caused by the reduction gear set and with a connection flow channel guiding the churning oil to move to a side of the motor housing when at least a predetermined amount of the churning oil is stored in the first reservoir unit,
   wherein the motor housing is provided with a second reservoir unit fluidically connected to the connection flow channel and storing the churning oil introduced into the second reservoir unit through the connection flow channel.
   wherein the reduction gear set includes:
      a differential gear unit coupled to the driveshaft; and
      a reduction gear unit disposed on a top side of the differential gear unit and connected to the differential gear unit.
   wherein the gear housing is provided with a guide unit located at a side of the gear housing above the differential gear unit, the guide unit thus being in contact with an oil caused by the differential gear unit and allowing the contacted oil to be moved toward the first reservoir unit along the guide unit, and
   wherein the guide unit has a predetermined area, with opposite end portions thereof being bent downward therefrom.

2. The motor apparatus of claim 1,
   wherein the gear housing is provided with a differential cover supporting the differential gear unit, and
   wherein the first reservoir unit collecting the churning oil is provided on the differential cover.

3. The motor apparatus of claim 2,
   wherein the differential cover includes a body unit through which the driveshaft passes, and which supports the differential gear unit, and
   wherein the first reservoir unit is formed on a top side of the body unit and formed to be open upwards, allowing the churning oil to be collected therein.

4. The motor apparatus of claim 3, wherein the first reservoir unit is provided with a first drain hole formed to penetrate through the first reservoir unit downward toward the driveshaft and with the connection flow channel fluidically connected thereto.

5. The motor apparatus of claim 1, wherein the motor housing is provided with an installation space in which the driving motor is provided and with the second reservoir unit at an upper side of the installation space to be open to the connection flow channel.

6. The motor apparatus of claim 5, wherein the second reservoir unit includes:
   a second drain hole penetrating through the second reservoir unit downward toward the installation space; and
   a connection hole penetrating through the second reservoir unit to allow the connection flow channel to be fluidically connected to the second reservoir unit.

7. The motor apparatus of claim 5, wherein the motor housing and the gear housing are provided with balance holes open to fluidically-communicate with each other when being coupled to each other, so that the churning oil in the motor housing and the gear housing moves through the balance holes.

8. The motor apparatus of claim 1, wherein the opposite end portions of the guide unit are bent downward toward the first reservoir unit.

9. The motor apparatus of claim 1, wherein the gear housing is provided with a third reservoir unit spaced from the first reservoir unit and configured to collect the contacted oil being guided by the guide unit.

10. The motor apparatus of claim 9, wherein the third reservoir unit is formed to be open upward toward the guide unit and is provided with a third drain hole penetrating through the third reservoir unit downward from the third reservoir unit.

* * * * *